United States Patent
Chang et al.

(10) Patent No.: US 8,240,721 B2
(45) Date of Patent: Aug. 14, 2012

(54) COVER LATCHING MECHANISM

(75) Inventors: Chih-Chiang Chang, Taipei Hsien (TW); Zhi Li, Shenzhen (CN); Zhi-Yun Shen, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 582 days.

(21) Appl. No.: 12/475,677

(22) Filed: Jun. 1, 2009

(65) Prior Publication Data
US 2010/0088861 A1    Apr. 15, 2010

(30) Foreign Application Priority Data

Oct. 13, 2008  (CN) .......................... 2008 1 0304905

(51) Int. Cl.
  *E05C 19/06* (2006.01)
(52) U.S. Cl. ....................... 292/80; 292/84; 292/DIG. 37
(58) Field of Classification Search ........... 292/DIG. 37, 292/327, 80, 84, 87; 24/458
See application file for complete search history.

(56) References Cited

U.S. PATENT DOCUMENTS

| | | | | | |
|---|---|---|---|---|---|
| 7,789,439 | B2 * | 9/2010 | Zhao et al. | ..................... | 292/163 |
| 7,806,446 | B2 * | 10/2010 | Oh | ................. | 292/165 |
| 7,842,412 | B2 * | 11/2010 | Zhang et al. | ..................... | 429/97 |
| 7,876,567 | B2 * | 1/2011 | Wang | ............................. | 361/726 |
| 2010/0081073 | A1 * | 4/2010 | Otsubo et al. | ................... | 430/66 |

* cited by examiner

Primary Examiner — Kristina Fulton
(74) Attorney, Agent, or Firm — Altis Law Group, Inc.

(57) ABSTRACT

A cover latching mechanism is provided including a base member, a cover member, and a button assembly. The base member includes an elastic hook. The cover member is detachable assembled to the base member. The button assembly is fixed to the cover member and movable relative to the cover member to latch to or release from the elastic hook. The button assembly includes a button member having a positioning arm and a sleeve portion and further defining a elastic hooking hole. The elastic hook engages into the elastic hooking hole so that the elastic hook latches the button assembly with the base member. The positioning arm secures the button assembly to the cover member. The restoring member can be deformed when the button assembly pressed, so that the elastic hook releases out of the elastic hooking hole.

14 Claims, 4 Drawing Sheets

COVER LATCHING MECHANISM

BACKGROUND

1. Technical Field

The present disclosure relates to cover latching mechanisms, and particularly to a cover latching mechanism of portable electronic devices.

2. Description of Related Art

Portable electronic devices often include latches for securing battery covers thereof. The latch mechanisms must withstand numerous installations and removals of batteries.

A typical cover latch mechanism includes at least one spring to facilitate its operation. However, the spring can wear out with repeated operation and, thus the cover latch mechanism may eventually fail.

Therefore, there is room for improvement within the art.

BRIEF DESCRIPTION OF THE DRAWINGS

Many aspects of the new cover latching mechanism can be better understood with reference to the following drawings. The components in the drawings are not necessarily drawn to scale, the emphasis instead being placed upon clearly illustrating the principles of the new cover latching mechanism. Moreover, in the drawings, like reference numerals designate corresponding parts throughout the several views.

DETAILED DESCRIPTION

Figure 1:
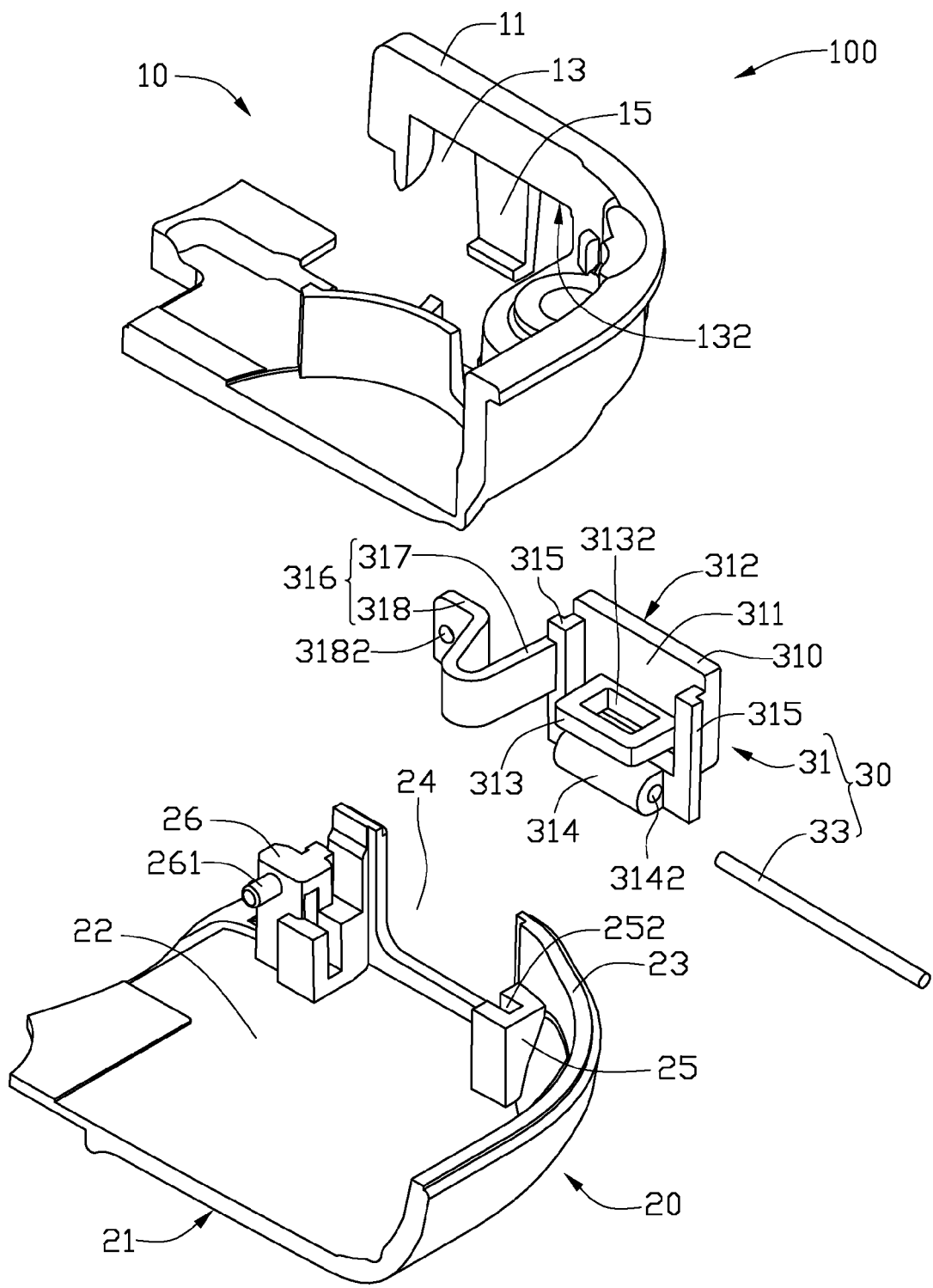
FIG. 1 is an exploded, isometric view of a cover latching mechanism according to an embodiment, including a base member, a cover member and a button assembly.

FIG. 1 shows an exemplary cover latching mechanism 100 for portable electronic devices including a base member 10, a cover member 20, and a button assembly 30. The cover member 20 can be detachably assembled to the base member 10 by the button assembly 30.

The base member 10 includes a sidewall 11 through which a generally rectangular notch 13 is defined. The bottom surface 132 of the sidewall 11 has an L-shaped elastic hook 15 protruding inside the notch 13.

The cover member 20 includes an exterior surface 21, an interior surface 22, and a bent portion 23. The bent portion 23 defines a cutout 24 corresponding to the notch 13. Two protrusions 25 are arranged on the interior surface 22, and at two sides of the cutout 24. Each protrusion 25 defines a latching slot 252. The two latching slots 252 align with each other. A positioning block 26 is formed on the interior surface 22 abutting one of the two protrusions 25. The positioning block 26 has a positioning post 261 extending inwardly inside the cover member 20.

The button assembly 30 includes a button member 31 and a deformable restoring member 33. The restoring member 33 is an elastic cylindrical shaft.

The button member 31 includes a pressing portion 310 having a first surface 311 and a second surface 312 opposite to the first surface 311. The button member 31 further includes a hooking portion 313, a sleeve portion 314, two L-shaped bent portions 315, and a positioning arm 316, all arranged on the first surface 311. The hooking portion 313 and the sleeve portion 314 are located between the bent portions 315. The hooking portion 313 defines a through hooking hole 3132. The sleeve portion 314 has a shaft hole 3142 defined axially therethrough. The two bent portions 315 protrude from two opposite edges of the first surface 311.

The positioning arm 316 includes a curved elastic arm portion 317 and a positioning portion 318. The arm portion 317 connects to the bent portion 315. The positioning portion 318 connects to the arm portion 317 substantially parallel to the first surface 311. The positioning portion 318 defines a positioning hole 3182 corresponding to the positioning post 261.

Figure 2:
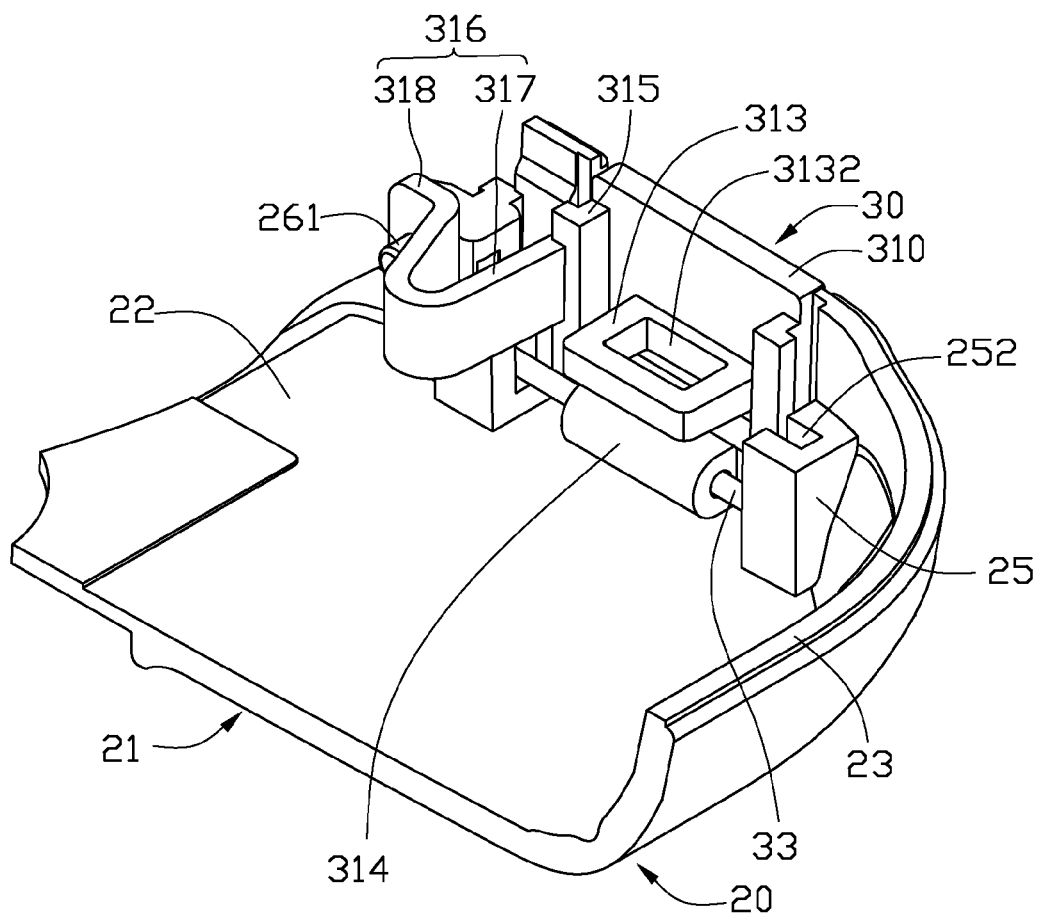
FIG. 2 is a partial assembled view of the cover latching mechanism shown in FIG. 1, with the button assembly assembled to the cover member.

Referring further to FIG. 2, after assembly, the restoring member 33 is rotatably engaged into the shaft hole 3142 and also latched in the latching slots 252. The positioning post 261 is fixedly positioned in the positioning hole 3182. The pressing portion 310 is located in the cutout 24 and the two bent portions 315 resist against the two edges of the cutout 24.

Figure 3:
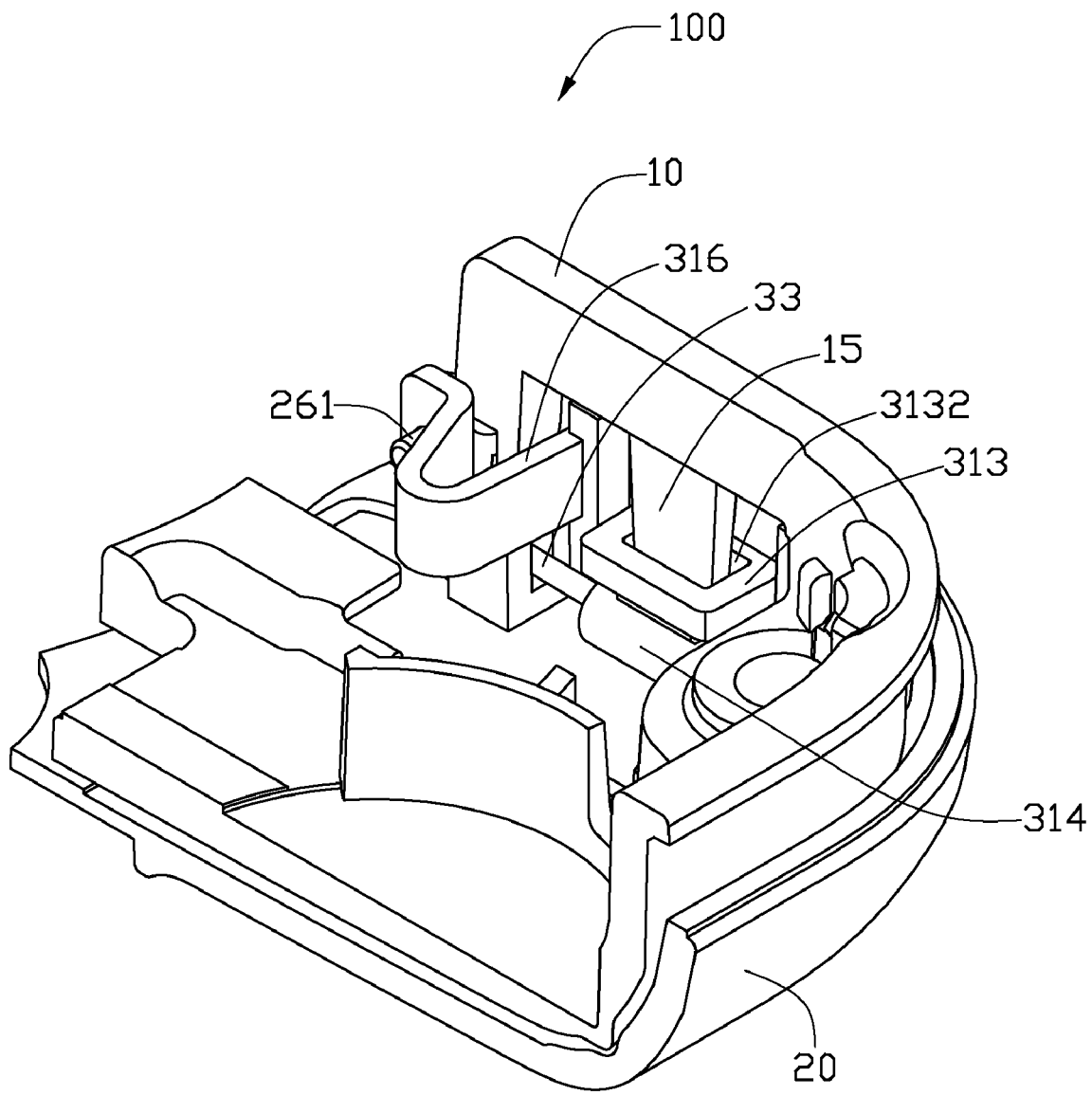
FIG. 3 is an assembled view of the cover latching mechanism shown in FIG. 1.
Figure 4:
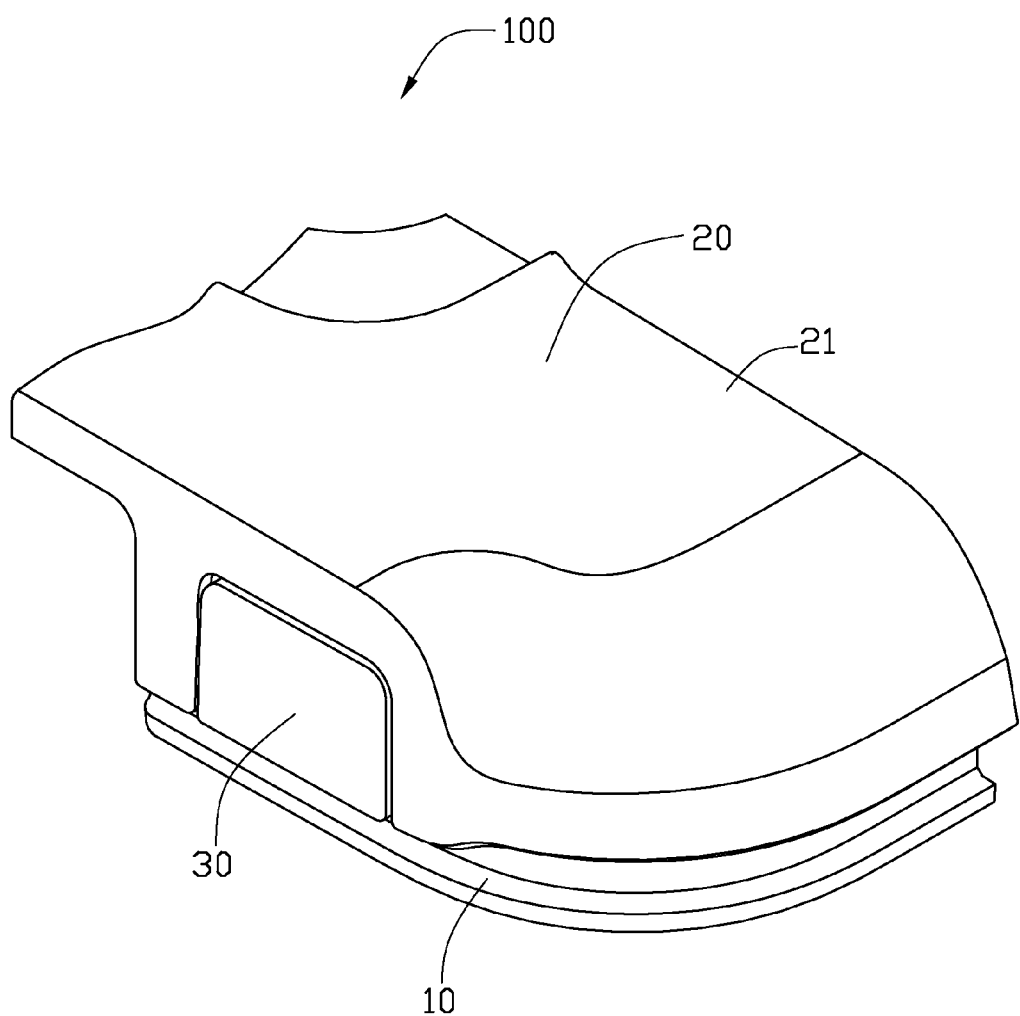
FIG. 4 is similar to FIG. 3, but showing another aspect.

Referring also to FIG. 3 and FIG. 4, to latch the cover member 20 to the base member 10, the hooking hole 3132 is aligned with the hook 15. By pressing the cover member 20 towards the base member 10, the hook 15 securely hooks into the hooking hole 3132. As such, the cover member 20 latches with the base member 10.

To release the latching, the button assembly 30 is pressed inwardly, the restoring member 33 is deformed and the arm portion 317 is further curved. During this course, the hook 15 moves to release out of the hooking hole 3132. At this time, the cover member 20 can be lifted up to remove from base member 10. When releasing the pressing, the restoring member 33 and the arm portion 317 return to their original positions and thus the button assembly 30 restores to its assembled position.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cover latching mechanism, comprising:
a base member comprising an elastic hook; and
a cover member for assembly with the base member,
a button assembly assembled with the cover member, comprising:
a button member comprising a positioning arm and a sleeve portion and further defining a hooking hole above the sleeve portion, the elastic hook detachably latched into the hooking hole, the positioning arm secured to the cover member, the button member further comprising a pressing portion having a first surface and a second surface opposite to the first surface, the cover member defining a cutout accommodating the pressing portion therein; and
an elastic restoring member rotatably received in the sleeve portion and latched with the cover member, the cover member comprising two protrusions at two sides of the cutout, each of the two protrusions defining a latching slot, the restoring member latched into the two latching slots;
wherein the button assembly is configured for being pressed so that the restoring member deforms inwardly inside the cover member to release the elastic hook from the hooking hole, thereby the cover member can be removed away from the base member.

2. The cover latching mechanism as claimed in claim 1, wherein the first surface has an elastic hooking portion formed thereon, the hooking hole defined through the elastic hooking portion.

3. The cover latching mechanism as claimed in claim 1, wherein the sleeve portion defines an axial through shaft hole.

4. The cover latching mechanism as claimed in claim 1, wherein the button member comprises two L-shaped bent portions, the bent portions arranged on the edges of the pressing portion.

5. The cover latching mechanism as claimed in claim 1, wherein the cover member comprises a positioning block, the positioning block comprises a positioning post, the positioning arm defines a positioning hole fixing the positioning post therein.

6. The cover latching mechanism as claimed in claim 5, wherein the positioning arm comprises an elastic arm portion and a positioning portion, the arm portion connected to the first surface, the positioning portion connected to the arm portion, the positioning hole defined through the positioning portion.

7. The cover latching mechanism as claimed in claim 1, wherein the base member comprises a notch, the elastic hook protruded from the bottom of the notch.

8. A cover latching mechanism, comprising:
a base member comprising an elastic hook; and
a cover member for detachable assembly to the base member,
a button assembly fixed to the cover member and movable relative to the cover member to latch to or release from the elastic hook, comprising:
a button member comprising a positioning arm and a sleeve portion and further defining a hooking hole above the sleeve portion, the elastic hook engaging into the hooking hole so that the elastic hook latching the button assembly with the base member, the positioning arm configured for securing the button assembly to the cover member, the button member further comprising a pressing portion having a first surface and a second surface opposite to the first surface, the cover member defining a cutout accommodating the pressing portion therein; and
a restoring member configured to be deformed when the button assembly pressed, so that the elastic hook is released from the hooking hole, the cover member comprising two protrusions at two sides of the cutout, each of the two protrusions defining a latching slot, the restoring member latched into the two latching slots.

9. The cover latching mechanism as claimed in claim 8, wherein the first surface has an elastic hooking portion formed thereon, the hooking hole defined through the elastic hooking portion.

10. The cover latching mechanism as claimed in claim 8, wherein the sleeve portion defines an axial through shaft hole.

11. The cover latching mechanism as claimed in claim 8, wherein the button member comprises two L-shaped bent portions, the bent portions arranged on the edges of the pressing portion.

12. The cover latching mechanism as claimed in claim 8, wherein the cover member comprises a positioning block, the positioning block comprises a positioning post, the positioning arm defines a positioning hole fixing the positioning post therein.

13. The cover latching mechanism as claimed in claim 12, wherein the positioning arm comprises an elastic arm portion and a positioning portion, the arm portion connected to the first surface, the positioning portion connected to the arm portion, the positioning hole defined through the positioning portion.

14. The cover latching mechanism as claimed in claim 8, wherein the base member comprises a notch, the elastic hook protruded from the bottom of the notch.

* * * * *